(12) United States Patent
Nishimura et al.

(10) Patent No.: US 7,134,870 B2
(45) Date of Patent: Nov. 14, 2006

(54) MOLD CLAMPING MECHANISM OF MOLDING MACHINE

(75) Inventors: Koichi Nishimura, Susono (JP); Yasuo Naito, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 83 days.

(21) Appl. No.: 10/817,916

(22) Filed: Apr. 6, 2004

(65) Prior Publication Data

US 2004/0208952 A1  Oct. 21, 2004

(30) Foreign Application Priority Data

Apr. 17, 2003  (JP)  ............... 2003-113344

(51) Int. Cl.
*B29C 45/64*  (2006.01)
(52) U.S. Cl. ............. 425/589; 425/595; 425/450.1
(58) Field of Classification Search ............. 425/589, 425/595, 450.1, 451.9
See application file for complete search history.

(56) References Cited

U.S. PATENT DOCUMENTS 3,642,403 A * 2/1972 Havlik ............ 425/590

| 4,781,568 | A | 11/1988 | Inaba |
| 5,378,141 | A | 1/1995 | Aoki |
| 6,626,658 | B1 | 9/2003 | Ito et al. |

FOREIGN PATENT DOCUMENTS

| CA | 2235262 | 10/1999 |
| JP | 61-188121 | 8/1986 |
| JP | 63-242512 | 10/1988 |
| JP | 7-156232 | * 6/1995 |
| JP | 11-028747 | 2/1999 |
| JP | 2001-260196 | 9/2001 |

OTHER PUBLICATIONS

EP Search Report for corresponding application EP 04 25 2107 dated Aug. 12, 2004.
First Examination Report (Office Action) in corresponding Chinese Patent Application 2004100307745.

* cited by examiner

*Primary Examiner*—James P. Mackey
(74) *Attorney, Agent, or Firm*—Staas & Halsey LLP

(57) ABSTRACT

In a mold clamping mechanism of a molding machine, at least two pieces of movable platen guides are provided separate from tie bars, inserting the movable platen guides into the holes formed in a movable platen. A sliding part of each movable platen guide on which at least the movable platen slides is given in the form of a ball spline shaft. Also, ball spline nuts are provided in the holes formed in the movable platen.

4 Claims, 13 Drawing Sheets

MOLD CLAMPING MECHANISM OF MOLDING MACHINE

BACKGROUND OF THE INVENTION

1. Field of the Invention

This invention relates to a mold clamping mechanism in a molding machine such as an injection molding machine.

2. Description of the Related Art

FIG. 11 is a schematic view for use in an illustration of a conventional mold clamping mechanism of a molding machine such as an injection molding machine. In the conventional mold clamping mechanism of the molding machine such as the injection molding machine, a fixed platen 2 is mounted in an upright position to a base frame 1 of the molding machine. The fixed platen 2 is connected to a rear platen 3 with tie bars 5, typically, four pieces of tie bars, and a movable platen 4 having through holes permitting these tie bars 5 to pass through is placed between the fixed platen 2 and the rear platen 3. With a moving-side mold 17a mounted to the movable platen 4, and with a fixed-side mold 17b mounted to the fixed platen 2, the conventional mold clamping mechanism drives the movable platen 4 with a drive source such as a motor and a hydraulic cylinder to effect clamping of the molds 17a and 17b in such a manner as to move the movable platen 4 with the tie bars 5 as guides.

The conventional mold clamping mechanism uses a slide bearing 15 for a sliding surface of the movable platen 4 with each tie bar 5. The through holes of the movable platen have slide bearing bushes 15a, 15b to ensure that each tie bar 5 passes through the bushes 15a, 15b.

The above conventional mold clamping mechanism requires the slide bearing at a sliding part of the movable platen with each tie bar, leading to an increase in clearance or play between an inside diameter of each slide bearing bush and an outside diameter of each tie bar. Thus, tilting of the movable platen is caused easily, resulting in degradation of the degree of parallelism between a surface of the moving-side mold mounted to the movable platen and a surface of the fixed-side mold mounted to the fixed platen.

In Japanese Patent Application Laid-open No. 2001-260196, for instance, there is disclosed a mold clamping mechanism of a molding machine, in which a movable platen has tie bar insertion holes each having ball spline nuts, while a sliding part of each tie bar on which at least the movable platen slides is given in the form of a ball spline shaft to ensure that prevention of tilting of the movable platen is provided.

FIG. 12 is a schematic view of the other conventional mold clamping mechanism described in the above Patent document. FIG. 13 is a view taken in the direction of an arrow A in FIG. 12. The movable platen 4 is moved along the tie bars 5 with a ball spline mechanism composed of the ball spline nuts 6a, 6b provided in each tie bar insertion hole and a ball spline shaft 14 provided for each tie bar 5.

The ball spline shaft of the above conventional mold clamping mechanism suffers a force inclusive of a mold clamping force, so that a diameter of the ball spline shaft needs to be sized equal to or larger than a diameter of each tie bar shaft. Thus, in application of the above arrangement to a large-sized molding machine, the above conventional mold clamping mechanism requires a ball spline shaft having a large diameter more than necessary, thereby providing disadvantages of causing an increase in cost, and besides, of being difficult to manufacture.

SUMMARY OF THE INVENTION

In the mold clamping mechanism of a molding machine, according to the present invention, tilting of a movable platen is prevented by providing movable platen guides adapted to guide the movable platen, separate from tie bars, and by applying a ball spline to each of the movable platen guides. The movable platen guides of the mold clamping mechanism according to the present invention do not bear any mold clamping force, so that no additional large force is applied to the movable platen guides. Thus, each movable platen guide does not require such a large diameter as being enough to withstand the mold clamping force, in other words, may have a diameter adequate to effect guiding, so that a manufacture cost reduction is attainable, and besides, facilitation of manufacturing becomes also possible. In particular, the movable platen guides have an effect when application of the movable platen guides to a mold clamping mechanism of a large-sized molding machine is made.

The mold clamping mechanism of a molding machine, according to the present invention comprises a fixed platen mounted on a base frame of the molding machine, a rear platen; tie bars permitting the fixed platen to be connected to the rear platen, and a movable platen placed between the rear platen and the fixed platen, and is adapted to effect clamping of molds mounted to the movable platen and the fixed platen by moving the movable platen along the tie bars. The mold clamping mechanism has at least two pieces of movable platen guides, separate from the tie bars; the movable platen has movable platen guide insertion holes into which the movable platen guides are inserted; a sliding part of each of the movable platen guides on which at least the movable platen slides is given in the form of a ball spline shaft; and ball spline nuts are provided in the movable platen guide insertion holes of the movable platen.

With the molds fixedly mounted to the movable platen and the fixed platen, the mold clamping mechanism according to the present invention effects closing, clamping and opening of the molds by moving the movable platen along the tie bars.

The opposite ends of each tie bar are fixed to the fixed platen and the rear platen. On the contrary, one end of each movable platen guide is fixed with the fixed platen, while the other end thereof is simply supported at the rear platen side. This arrangement is effective in causing the tie bars to bear the mold clamping force, while allowing the movable platen guides to effect only guiding of the movable platen without causing the movable platen guides to bear any mold clamping force. In the above arrangement, the ball spline nuts are provided in the movable platen guide insertion holes, and the sliding part of each movable platen guide on which at least the movable platen slides is given in the form of the ball spline shaft.

No application of any mold clamping force to the movable platen guides is caused, so that the ball spline shaft does not need to have a large diameter, in other words, may have a diameter adequate to effect guiding. This arrangement enables the ball spline to be applied to an arrangement adaptable to provide prevention of tilting of the movable platen.

The movable platen of the mold clamping mechanism according to the present invention is allowable to be composed of two members, specifically, a movable member and an auxiliary member fixed to a fixed platen-side surface of the movable member, and these two members are fixed with bolts or the like. The auxiliary member is effective in reducing an influence that movable platen strain caused by the mold clamping force has on the ball spline.

In addition, the movable platen and the auxiliary member may be formed with different materials. A material having rigidity higher than that of a movable platen material, for instance, is used for the auxiliary member. The material having high rigidity used herein means a material that ensures high modulus of longitudinal elasticity. When the movable platen formed with gray cast iron or spheroidal graphite cast iron is used, for instance, general structural rolled steel, general structural carbon steel or general structural alloyed steel having modulus of longitudinal elasticity about twice as high as that of the above movable platen material is used as a material of the auxiliary member.

In general, the movable platen requires a complicated structure, while the auxiliary member may have a simplified structure. The material having high modulus of longitudinal elasticity is hard to be machined, leading to an increase in cost. The present invention provides facilitation of machining to ensure that a cost reduction is attainable by using a material having a low modulus of longitudinal elasticity for a movable platen having the complicated structure, and by using a material having a high modulus of longitudinal elasticity for an auxiliary member having a simplified structure.

Alternatively, the mold clamping mechanism of the molding machine according to the present invention may also have a guide support between the rear platen and the movable platen. The guide support is a member adapted to support the movable platen guides in an inserted condition, and is effective in supporting the movable platen guides, as a substitute of the rear platen. The guide support is connected to the rear platen through connection members.

In the arrangement in which prevention of tilting of the movable platen is provided by using the ball spline shaft for the mold clamping mechanism, separate from the tie bars, the present invention makes it possible to obtain the ball spline shaft whose diameter is small-sized, and to provide facilitation of manufacturing, with a cost reduction attained.

BRIEF DESCRIPTION OF THE DRAWINGS

The foregoing and other objects and features of the invention will become more apparent in the following description of presently preferred embodiments of the invention taken in conjunction with the accompanying drawings, in which.

DESCRIPTION OF THE EMBODIMENTS

A mold clamping mechanism according to a first embodiment of the present invention will now be described with reference to FIG. 1 to FIG. 4C.

Figure 1:
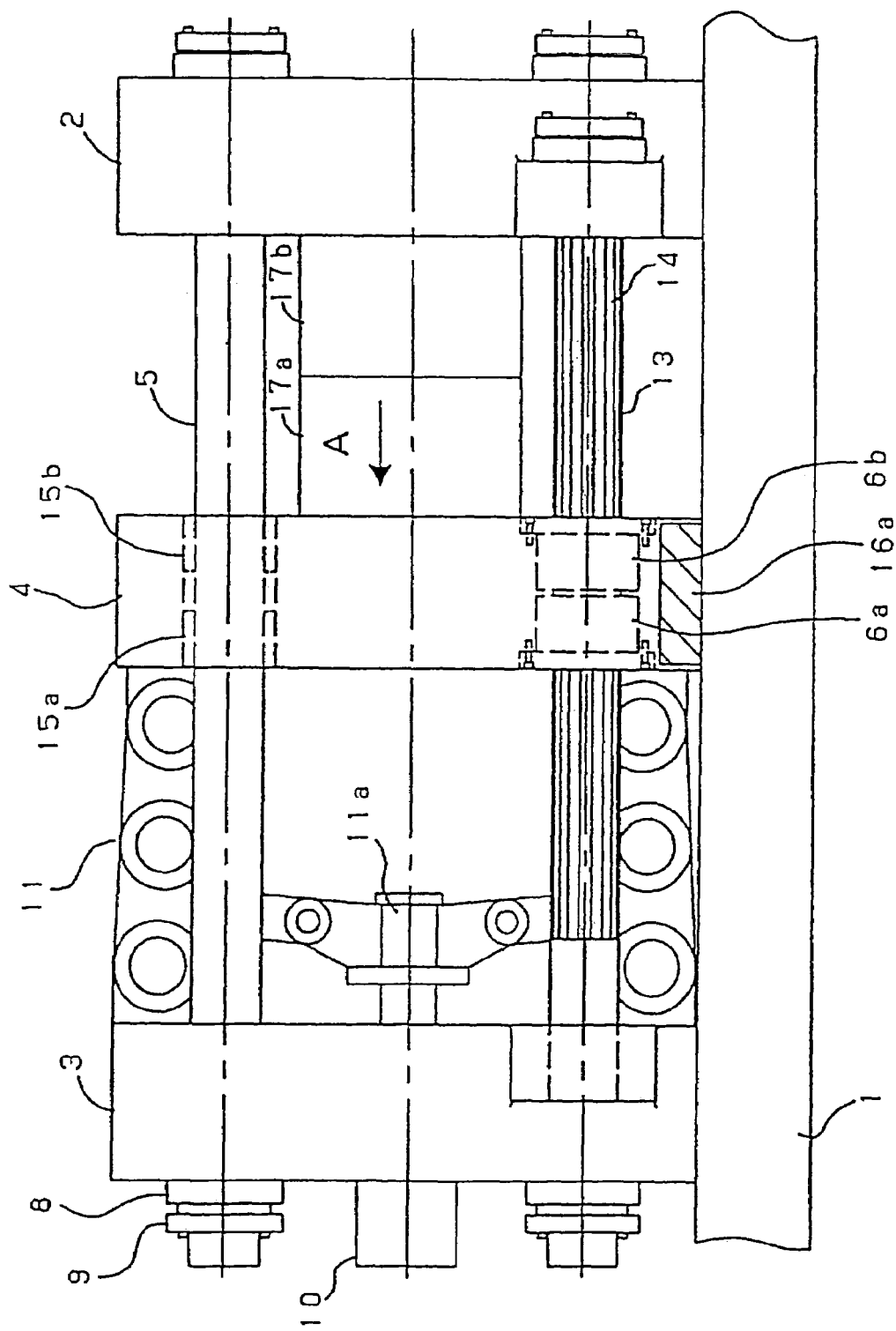
FIG. 1 is a schematic view showing a mold clamping mechanism according to a first embodiment of the present invention.

FIG. 1 is a schematic view showing the mold clamping mechanism according to the first embodiment of the present invention. The mold clamping mechanism shown in FIG. 1 has movable platen guides, and each movable platen guide has a ball spline shaft.

In FIG. 1, there is shown a fixed platen 2 fixed in an upright position to a base frame 1 of a molding machine. One end of each of four pieces of tie bars 5 is fixed to the fixed platen 2, and a rear platen 3 is mounted to the other end of each of the tie bars 5. Oppositely facing surfaces of the fixed platen 2 and the rear platen 3 take a rectangular shape, and the tie bars 5 pass through the four corners of the above oppositely facing surfaces, respectively (one of the tie bars 5 is only shown in FIG. 1).

While the fixed platen 2 is fixed to the tie bars 5 with nuts, the rear platen 3 is mounted to the tie bars 5 in a condition where movement of the rear platen is permitted along the tie bars 5 through mold thickness adjusting nuts 8. A pinion 9 is fitted to each nut 8. A chain (not shown) is mounted across a space between the pinions 9 of the respective tie bars 5. The nuts 8 of the respective tie bars 5 provide synchronous turning by driving the chain with a mold thickness adjusting motor (not shown), and as a result, the rear platen 3 moves nearer to or away from the fixed platen 2. The above rear platen motion is adapted to adjust a distance between the rear platen 3 and the fixed platen 2, thereby permitting adjustment on a thickness of a mold being in service and a mold clamping force.

Also, a movable platen 4 is placed between the fixed platen 2 and the rear platen 3 so as to be guided along the above four-pieces of tie bars 5. A toggle mechanism 11 is placed between the rear platen 3 and the movable platen 4, and the rear platen 3 has a drive source 10 (specifically, a mold clamping servomotor) adapted to move a cross head 11a of the toggle mechanism 11.

The movable platen 4 has tie bar insertion holes respectively having slide bearing bushes 15a, 15b. Alternatively, in place of a slide bearing, there may be provided a clearance between an inside surface of each tie bar insertion hole of the movable platen 4 and an outside surface of each tie bar 5 in such a manner that an inside diameter of each tie bar insertion hole of the movable platen 4 is sized larger than an outside diameter of each tie bar 5.

In addition to the four pieces of tie bars 5, one end of each of at least two pieces of movable platen guides 13 is also fixed to the fixed platen 2 with nuts or the like. Insertion of the other end of each of the movable platen guides 13 into a corresponding fit hole of the rear platen 3 allows an axial center of each movable platen guide 13 to be held in place in the range of prescribed accuracy. Alternatively, a guide support provided between the rear platen 3 and the movable platen 4 is also adaptable to support the other end of each movable platen guide, instead of supporting with the rear platen 3. A description of an arrangement of supporting with the guide support will be given later.

Each movable platen guide 13 has a ball spline shaft 14 obtained by applying ball spline to a sliding range of each movable platen guide 13 on which at least the movable platen 4 slides.

The movable platen 4 has ball spline nuts 6a, 6b at a portion permitting each movable platen guide 13 to pass through, and these ball spline nuts are adapted, together with the ball spline shaft 14 of each movable platen guide 13, to form a ball spline mechanism. In the embodiment of FIG. 1, there is shown the movable platen 4 having two pieces of ball spline nuts 6a, 6b. Alternatively, the number of ball spline nuts may be determined as desired. A length of a ball spline engagement part may increase with the increasing number of ball spline nuts, thereby providing an increased effect of preventing tilting variations of the movable platen 4.

Arrangements of the tie bars 5 and the movable platen guides 13 in the mold clamping mechanism according to the first embodiment will be described in the following.

A description of a first exemplified arrangement of the tie bars 5 and the movable platen guides 13 will be given with reference to FIG. 2A specified as a top view of the movable platen 4 and FIG. 2B specified as a view showing the movable platen 4 taken in the direction shown by an arrow A in FIG. 1.

The movable platen 4 has two kinds of holes, specifically, holes permitting insertion of the tie bars 5 and another holes permitting insertion of the movable platen guides 13. Each of the holes permitting insertion of the tie bars 5 has the slide bearing bushes 15a, 15b. Each of the holes permitting insertion of the movable platen guides 13 has the ball spline nuts 6a, 6b, and these ball spline nuts 6a, 6b are engaged with the ball spline shaft 14 of each movable platen guide 13 into the ball spline mechanism.

The above arrangement leads to insertion of the tie bars 5 into the movable platen 4 through the slide bearing bushes 15a, 15b and also insertion of the movable platen guides 13 into the movable platen 4 through the ball spline nuts 6a, 6b.

Figure 2A:
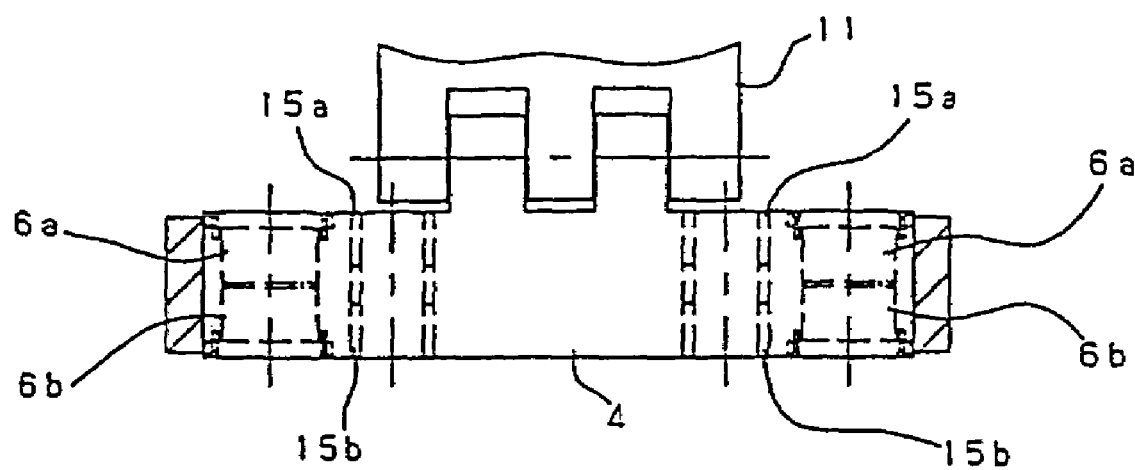
FIGS. 2A and 2B illustrate a first exemplified arrangement of tie bars and movable platen guides in the mold clamping mechanism shown in FIG. 1.
Figure 2B:
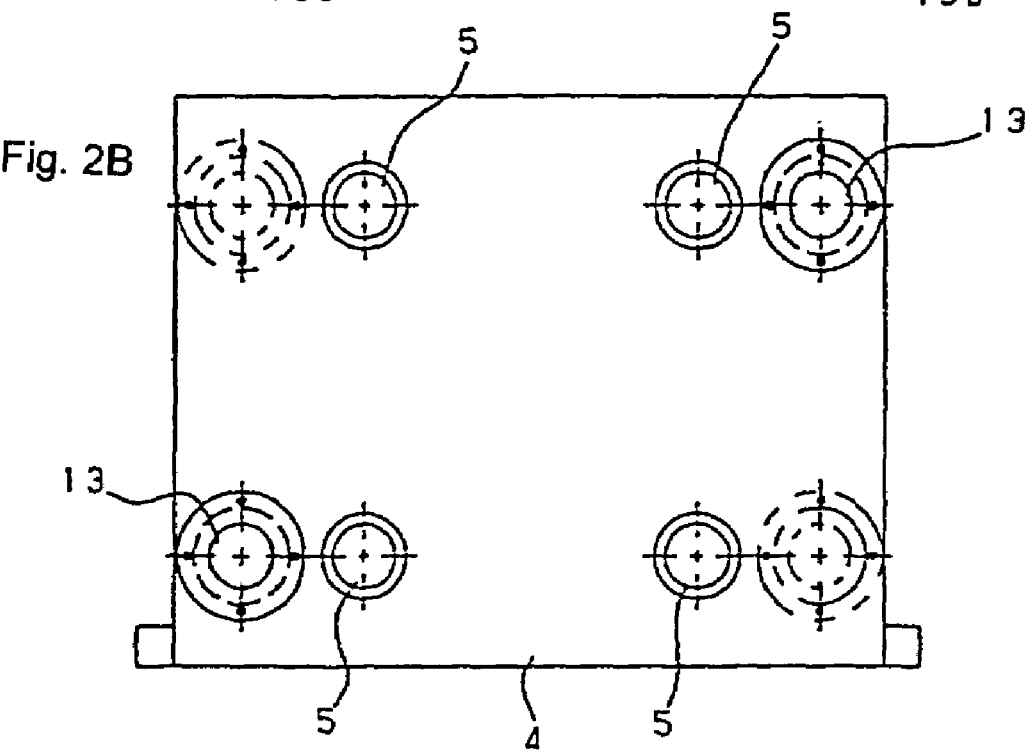

Although the arrangement in which the movable platen guides 13 are respectively placed at the outside of the tie bars 5 is shown in FIGS. 2A and 2B, a positional relationship between the movable platen guides 13 and the tie bars 5 is not limited to the above arrangement.

Figure 3A:
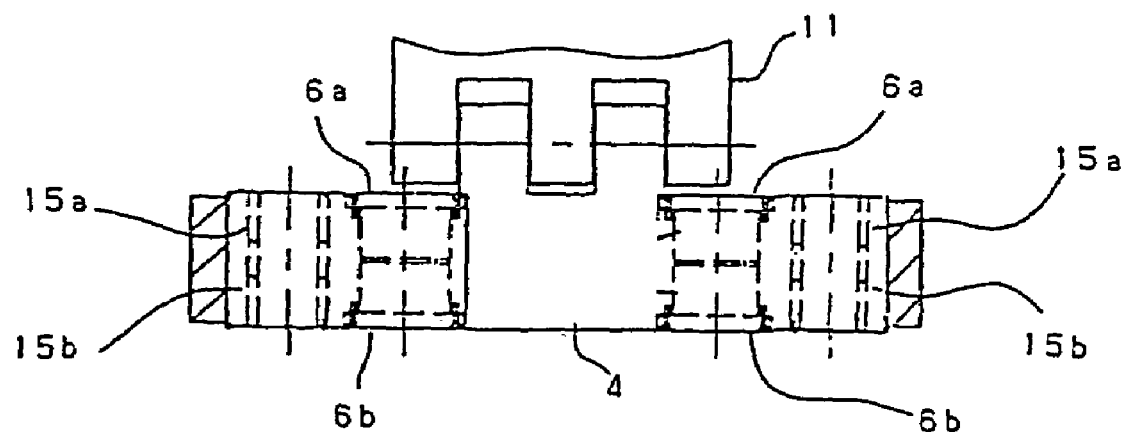
FIGS. 3A and 3B illustrate a second exemplified arrangement of the tie bars and the movable platen guides in the mold clamping mechanism shown in FIG. 1.
Figure 3B:
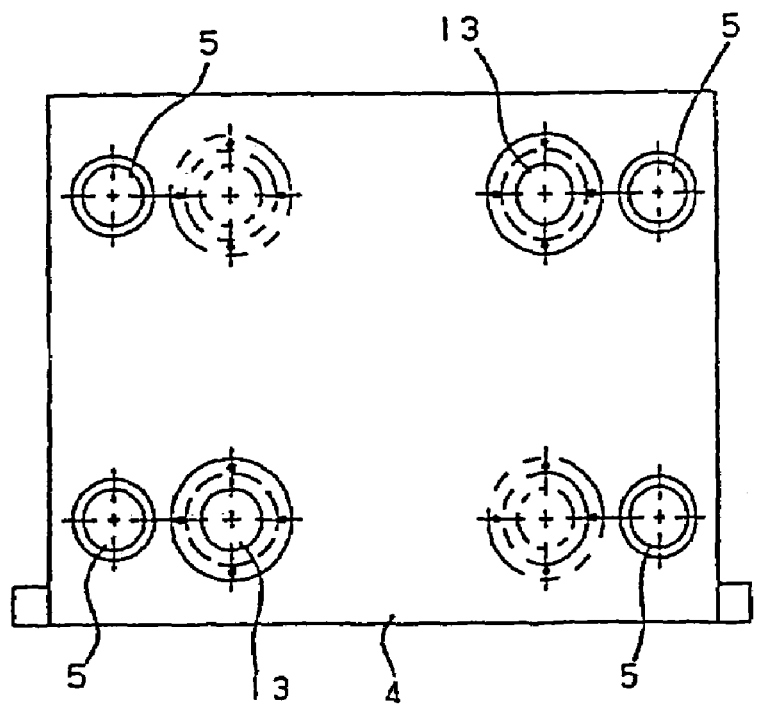
Figure 4A:
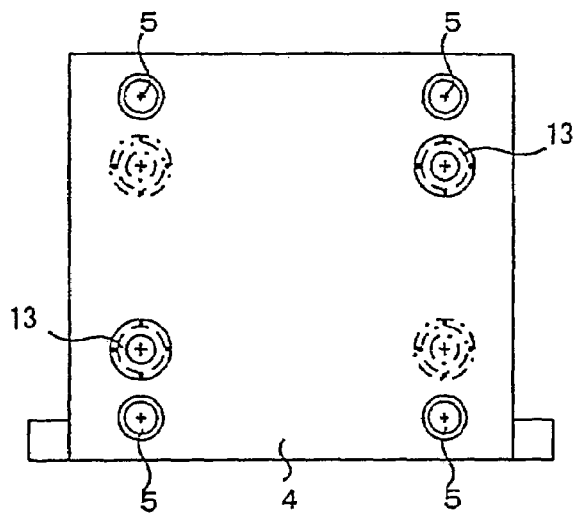
FIGS. 4A to 4C illustrate third to fifth exemplified arrangements of the tie bars and the movable platen guides in the mold clamping mechanism shown in FIG. 1.
Figure 4B:
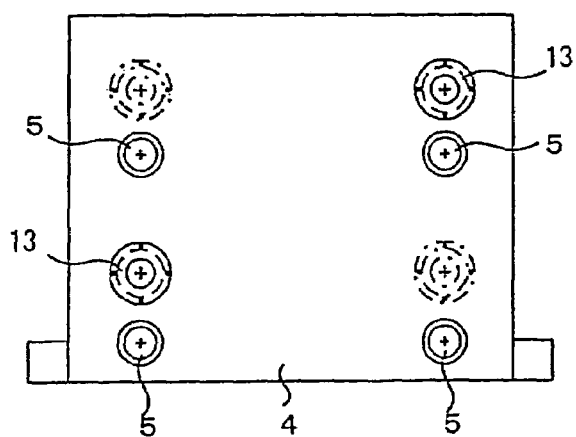
Figure 4C:
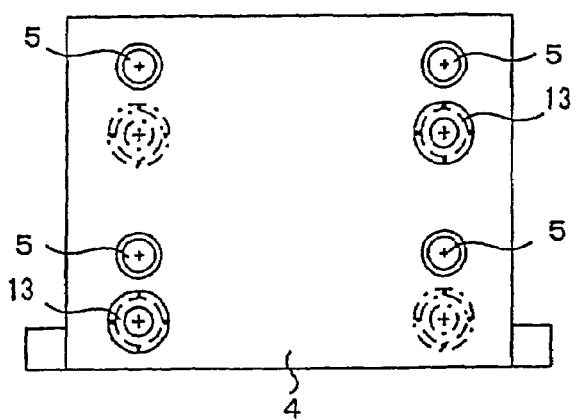

Alternatively, the movable platen guides 13 may be also placed at the inside of the tie bars 5 (a second exemplified arrangement), as shown in FIG. 3A specified as a top view of the movable platen 4 and FIG. 3B specified as a view showing the movable platen 4 taken in the direction shown by the arrow A in FIG. 1. Alternatively, the movable platen guides 13 may be also placed above or below the tie bars 5 (a third exemplified arrangement), as shown in FIG. 4A. In addition, FIG. 4B shows a different arrangement (a fourth exemplified arrangement) in which the movable platen guides 13 are placed above the tie bars 5. FIG. 4C shows a further different arrangement (a fifth exemplified arrangement) in which the movable platen guides 13 are placed below the tie bars 5.

It is noted that FIGS. 2B, 3B, 4A, 4B and 4C illustrate the arrangements of two pieces of movable platen guides 13 at positions shown by solid lines or chain lines, or those of four pieces of movable platen guides 13 at positions shown by solid lines and chain lines.

It is also noted that reference numeral 16a in FIG. 1 denotes a platen support, which is operative between the movable platen 4 and the base frame 1 to adjust tilting of the platen.

Molds are respectively mounted to the oppositely facing surfaces (not shown) of the fixed platen 2 and the movable platen 4. Specifically, a moving-side mold 17a is mounted to the movable platen 4, while a fixed-side mold 17b is mounted to the fixed platen 2. Then, the mold clamping mechanism drives the toggle mechanism 11 by driving the drive source 10 to effect closing, clamping and opening of the molds in such a manner as to move the movable platen 4 along the tie bars 5.

Specifically, the arrangement adopted in the conventional mold clamping mechanism (See Japanese Patent Application Laid-open No. 2001-260196) is that the tie bars have the ball spline shafts. On the contrary, the mold clamping mechanism according to the first embodiment of the present invention is different from the above conventional mold clamping mechanism in that it has movable platen guides, separate from the tie bars, and a ball spline shaft is provided on each movable platen guide.

The mold clamping mechanism according to a second embodiment of the present invention will be described in the following with reference to FIG. 5 to FIG. 7B.

Figure 5:
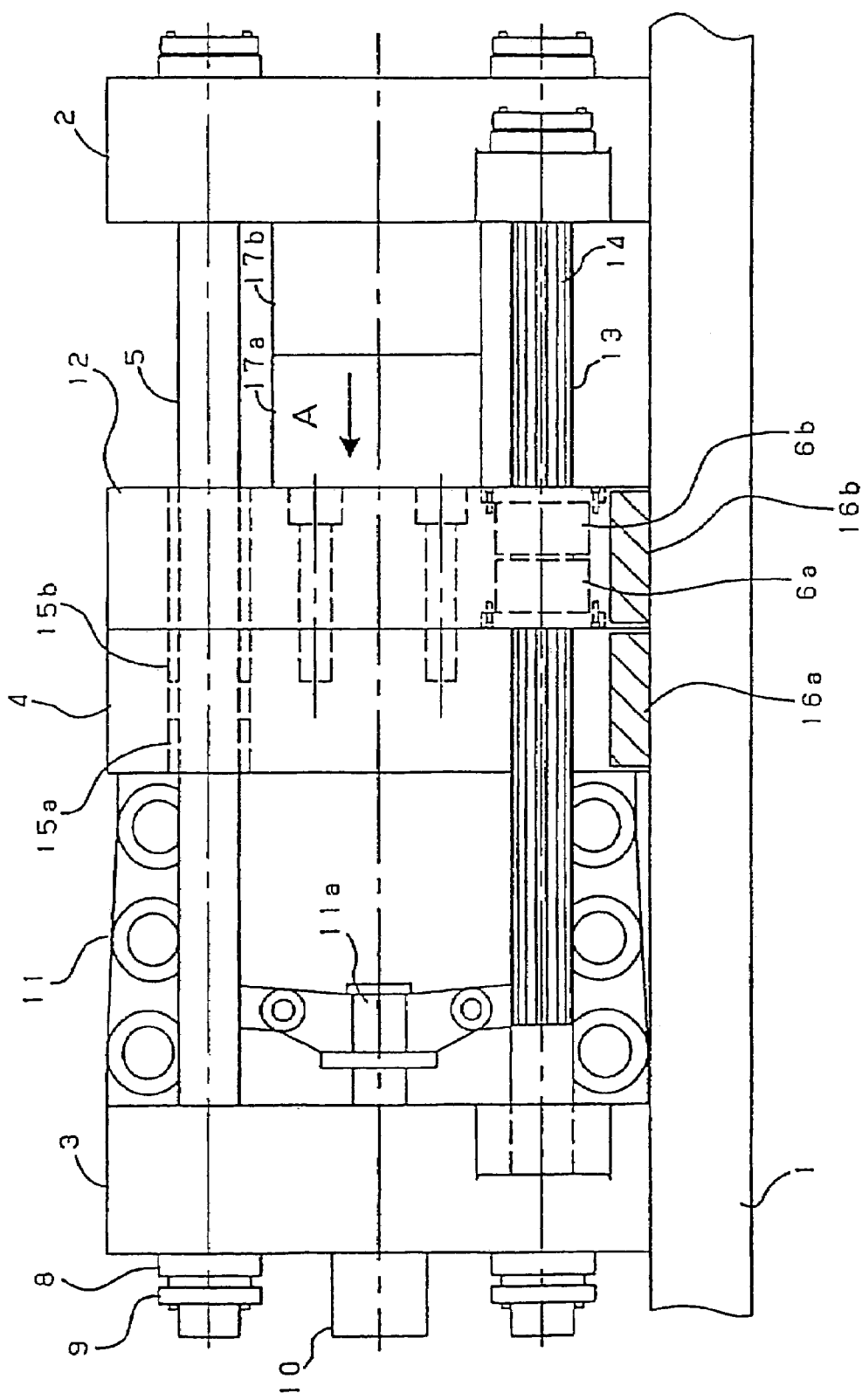
FIG. 5 is a schematic view showing a mold clamping mechanism according to a second embodiment of the present invention.

FIG. 5 is a schematic view showing the mold clamping mechanism according to the second embodiment. The mold clamping mechanism shown in FIG. 5 has an auxiliary member joined with the movable platen, and the auxiliary member and the movable platen guides are adapted to form the ball spline mechanism.

The mold clamping mechanism according to the second embodiment is different from the mold clamping mechanism according to the first embodiment in that it has an auxiliary member. It is noted that in the following description on the second embodiment, a description on an arrangement common to the first and second embodiments will be omitted.

In addition to the movable platen 4, an auxiliary member 12 is placed between the fixed platen 2 and the rear platen 3, and four pieces of tie bars 5 and more than one movable platen guide 13 pass through the movable platen 4 and the auxiliary member 12, respectively. The auxiliary member 12 is in engagement with the movable platen 4 with fixing members such as bolts.

Further, each movable platen guide 13 has the ball spline shaft 14 formed by applying ball spline to a sliding range of each movable platen guide 13 on which at least the auxiliary member 12 slides. The auxiliary member 12 has movable platen guide insertion holes respectively having ball spline nuts 6a, 6b. On the contrary, the movable platen 4 has tie bar insertion holes respectively having slide bearing bushes 15a, 15b. Alternatively, in place of the slide bearing, there may be provided a clearance between an inside surface of each tie bar insertion hole of the movable platen 4 and an outside surface of each tie bar 5 in such a manner that an inside diameter of each tie bar insertion hole of the movable platen 4 is sized larger than an outside diameter of each tie bar 5.

Specifically, the arrangement adopted in the conventional mold clamping mechanism is that insertion of the tie bars into the movable platen is performed in a condition where the holes of the movable platen have the ball spline nuts respectively. On the contrary, the mold clamping mechanism according to the second embodiment of the present invention is different from the above conventional mold clamping mechanism in that the movable platen is guided with the ball spline nuts provided in the holes of the auxiliary member fixed to one surface side of the movable platen.

The movable platen and the auxiliary member engaged with each other may be formed with different materials. A material having rigidity higher than that of a movable platen material, for instance, is used for the auxiliary member. The material having high rigidity used herein means a material that ensures high modulus of longitudinal elasticity. When the movable platen formed with gray cast iron or spheroidal graphite cast iron is used, general structural rolled steel, general structural carbon steel or general structural alloyed steel having modulus of longitudinal elasticity about twice as high as the above movable platen material is used as a material of the auxiliary member.

The movable platen requires a complicated structure because a toggle mechanism is mounted on the movable platen, so that a low rigidity material that is easy to cast is generally used for the movable platen. Forming of the movable platen with the high rigidity material would lead to an increase in cost. On the contrary, the auxiliary member may have a simple structure, so that any complicated machining is not required. The mold clamping mechanism according to the second embodiment may provide facilitation of machining, and besides, may attain a cost reduction by forming the auxiliary member with the high rigidity material.

Also, the molds (specifically, the moving-side mold 17a and the fixed-side mold 17b) are mounted to the oppositely facing surfaces of the fixed platen 2 and the auxiliary member 12, respectively. Then, dividing the drive source 10, the mold clamping mechanism drives the toggle mechanism 11 to move the movable platen 4 and the auxiliary member 12 along the tie bars 5, thereby effecting mold closing, mold clamping and mold opening. The mold clamping force causes the movable platen 4, the auxiliary member 12 and the fixed platen 2 to be deformed, with the result that strain of the movable platen 4 is increased since the movable platen 4 is directly connected to the toggle mechanism 11. On the contrary, strain of the auxiliary member 12 is reduced since the auxiliary member 12 is placed with the movable platen 4 put between the auxiliary member 12 and the toggle mechanism 11. This arrangement is adaptable to decrease deformation applied to the ball spline nuts provided in the auxiliary member 12.

An exemplified arrangement of the tie bars 5 and the movable platen guides 13 in the second embodiment will be described in the following.

A description of a first exemplified arrangement of the tie bars 5 and the movable platen guides 13 will be given with reference to FIG. 6A specified as a top view of the movable platen 4 and FIG. 6B specified as a view showing the movable platen 4 taken in the direction shown by an arrow A in FIG. 5.

The movable platen 4 has holes permitting insertion of the tie bars 5. The auxiliary member 12 has holes permitting insertion of the movable platen guides 13. The tie bar 5-insertion holes of the movable platen 4 have slide bearing bushes 15a, 15b. The movable platen guide insertion holes of the auxiliary member 12 have ball spline nuts 6a, 6b, and these ball spline nuts 6a, 6b are engaged with the ball spline shaft 14 of each movable platen guide 13. With these arrangement, a ball spline mechanism is consitituted.

The above arrangement leads to insertion of the tie bars 5 into the movable platen 4 through the slide bearing bushes 15a, 15b and also insertion of the movable platen guides 13 into the auxiliary member 12 through the ball spline nuts 6a, 6b.

Figure 6A:
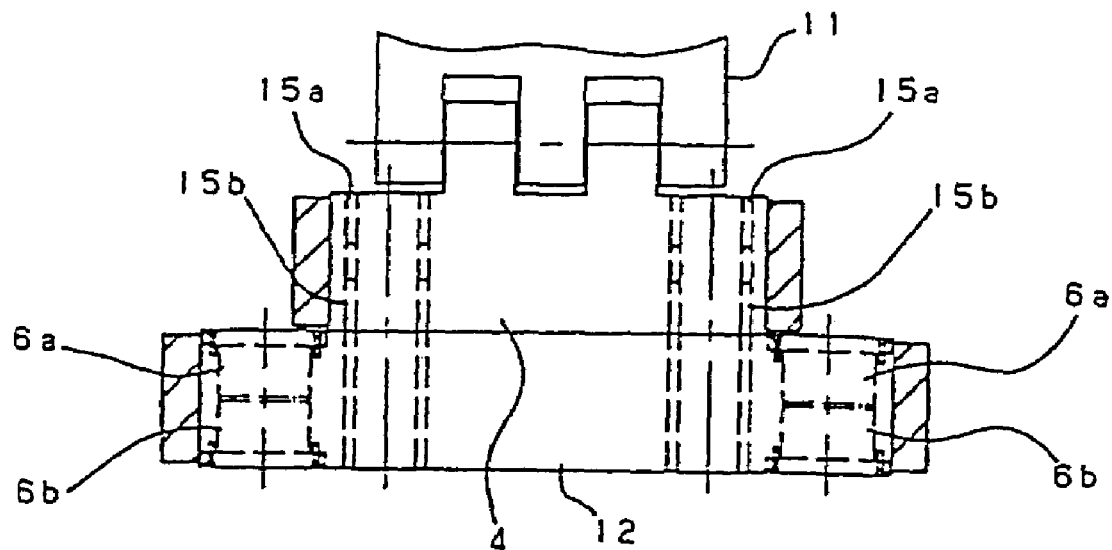
FIGS. 6A and 6B illustrate a first exemplified arrangement of the tie bars and the movable platen guides in the mold clamping mechanism shown in FIG. 5.
Figure 6B:
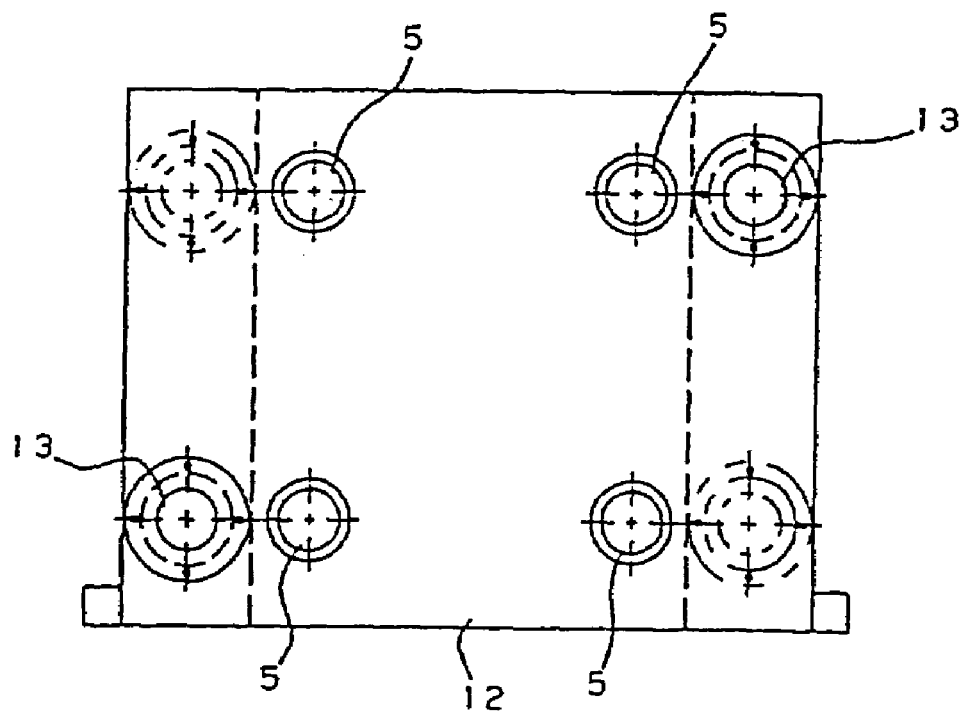
Figure 7A:
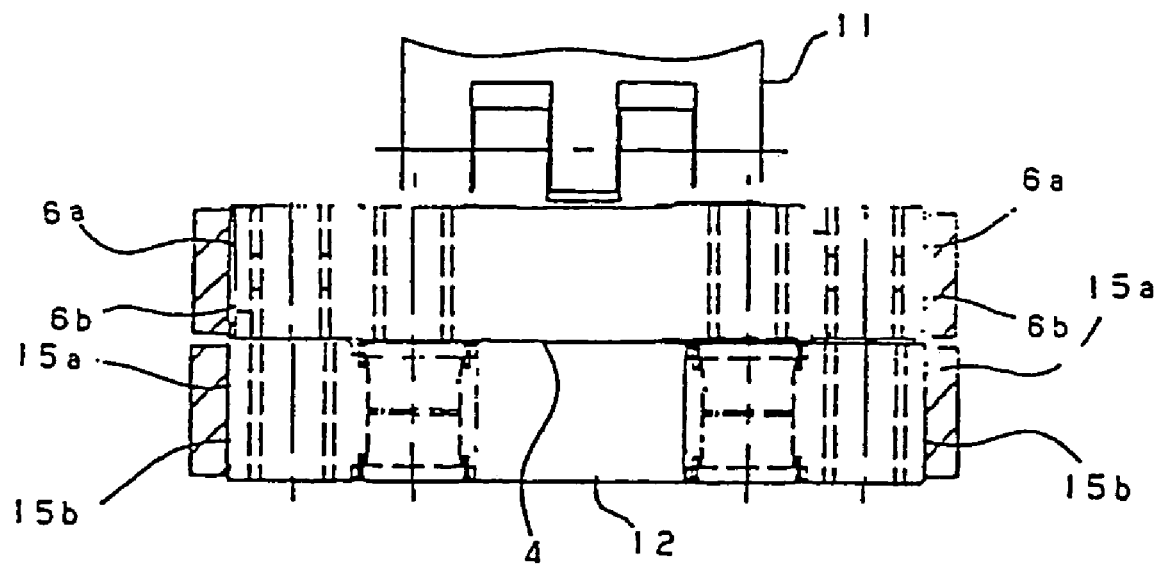
FIGS. 7A and 7B illustrate a second exemplified arrangement of the tie bars and the movable platen guides in the mold clamping mechanism shown in FIG. 5.

Although the arrangement in which the movable platen guides 13 are placed at the outside of the tie bars 5 is shown in FIGS. 6A and 6B, a positional relationship between the movable platen guides 13 and the tie bars 5 is not limited to the above arrangement. Alternatively, the movable platen guides 13 may be also placed at the inside of the tie bars 5, for instance, as shown in FIGS. 7A and 7B.

Figure 7B:
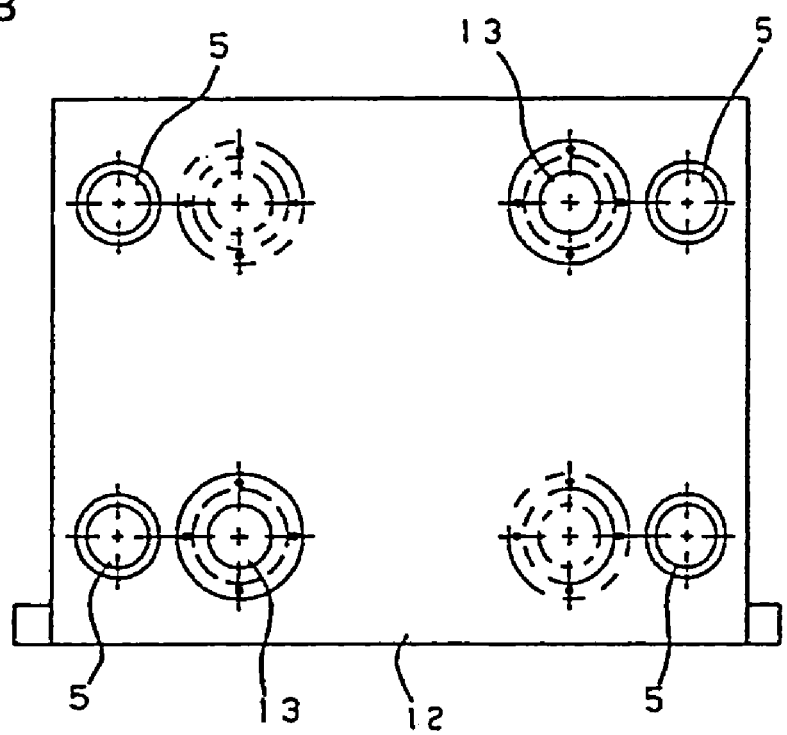

It is noted that FIGS. 6B and 7B illustrate the arrangements of two pieces of movable platen guides 13 at positions shown by solid lines or chain lines or those of four pieces of movable platen guides 13 at positions shown by solid lines and chain lines.

The mold clamping mechanism according to a third embodiment of the present invention will be described in the following with reference to FIGS. 8 and 9.

Figure 8:
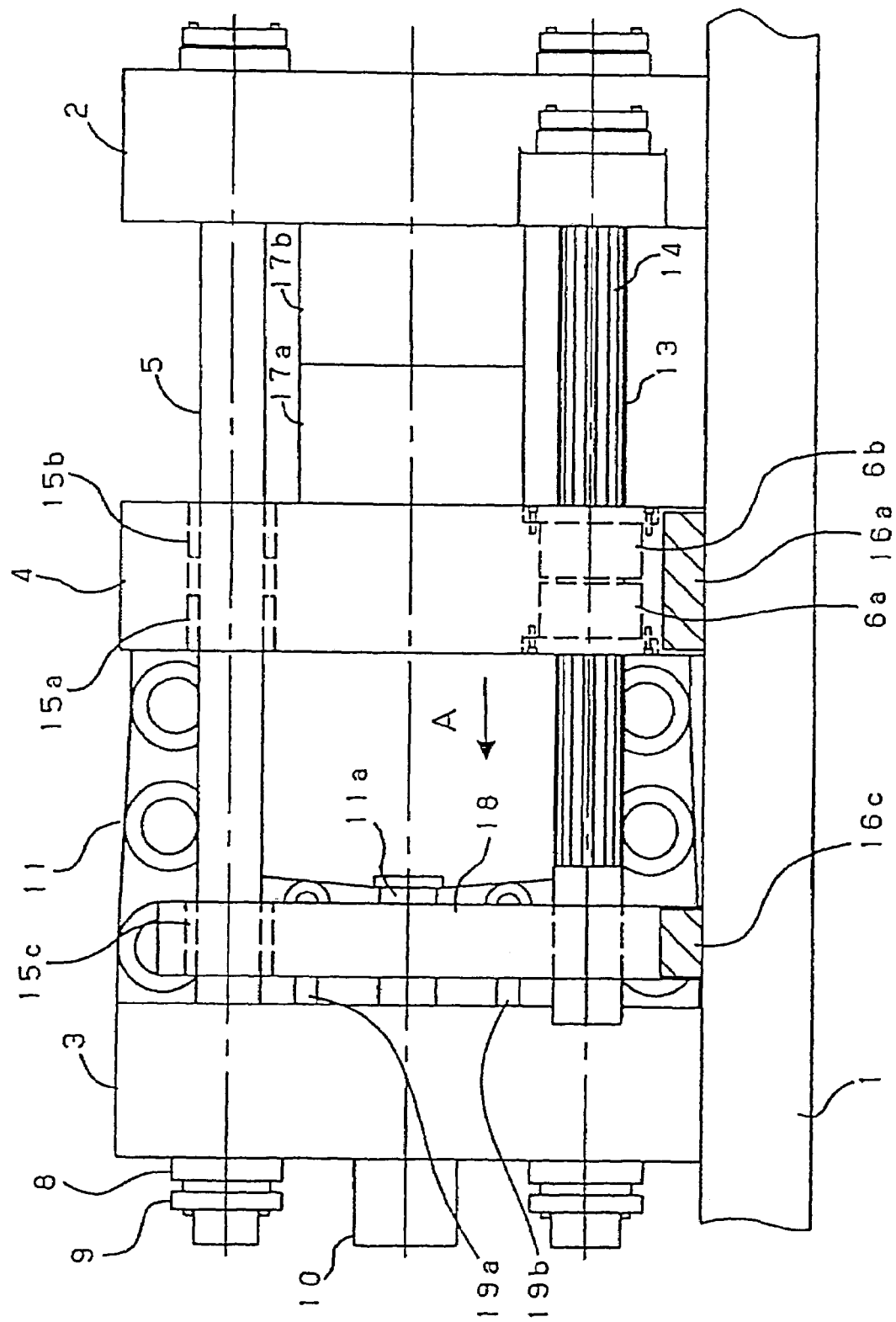
FIG. 8 is a schematic view showing a mold clamping mechanism according to a third embodiment of the present invention.

FIG. 8 is a schematic view showing the mold clamping mechanism according to the third embodiment. The mold clamping mechanism shown in FIG. 8 has a guide support 18 between the movable platen 4 and the rear platen 3, and a mechanism adapted to support the movable platen guides 13 with the guide support 18 is involved in the above mold clamping mechanism.

The mold clamping mechanism according to the third embodiment as shown in FIG. 8 is equivalent to a structure obtained by adding the guide support to the mold clamping mechanism (shown in FIG. 1) according to the first embodiment. It is thus noted that in the following description on the third embodiment, a different arrangement from the first embodiment will be only described without giving any description of the arrangement common to the first embodiment.

The guide support 18 is placed between the movable platen 4 and the rear platen 3, and is supported in two locations with the tie bars 5 through a slide bearing bush 15c. Also, the guide support 18 is connected to the rear platen 3 through connection members 19a, 19b. Each of the connection members 19a, 19b may be an integral part of the rear platen 3. Alternatively, each of the connection members 19a, 19b and the rear platen 3 may be different parts. Further, the guide support 18 has a hole permitting insertion of one end of each movable platen guide 13 to ensure that insertion of each movable platen guide 13 into the hole of the guide support is adapted to support one end of each movable platen guide 13. The guide support 18 may also have a height adjusting support 16c.

Figure 9A:
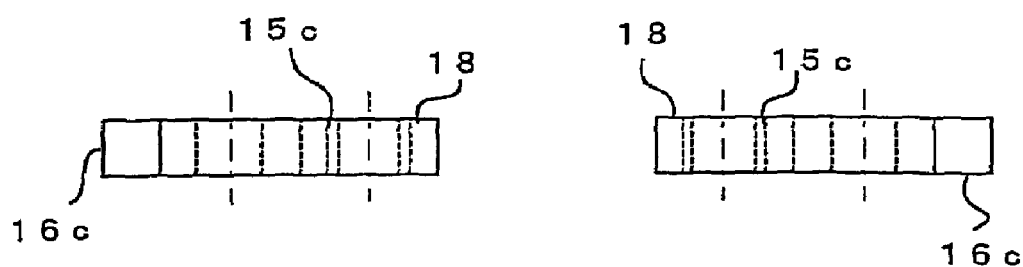
FIGS. 9A and 9B illustrate an exemplified arrangement of the tie bars and the movable platen guides in the mold clamping mechanism shown in FIG. 8.
Figure 9B:
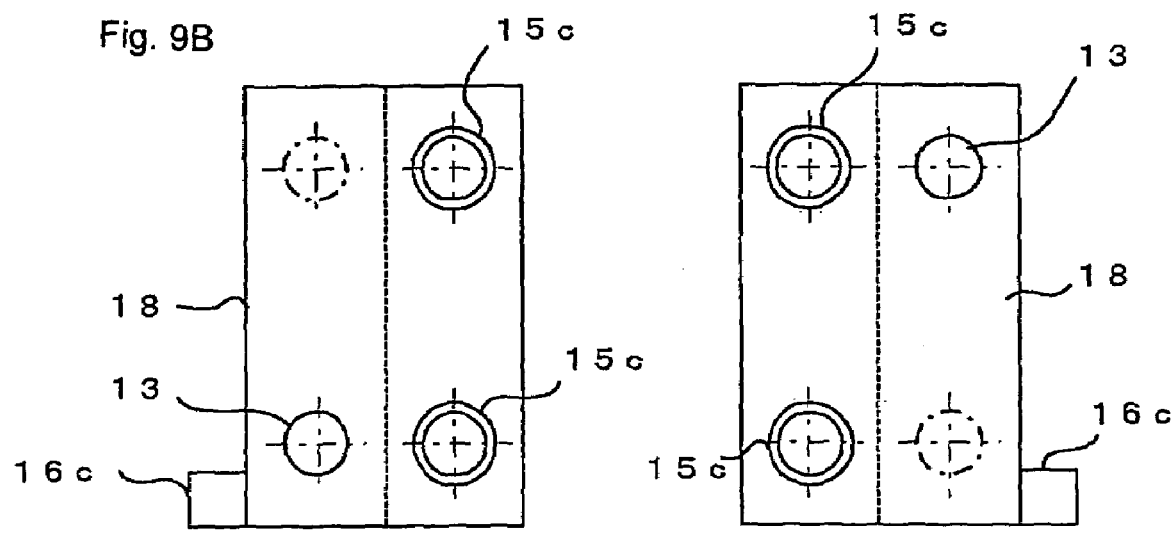

An arrangement of the movable platen guides 13 and the tie bars 5 is shown in FIG. 9A specified as a top view of the guide support 18 and FIG. 9B specified as a view showing the guide support 18 taken in the direction shown by an arrow A in FIG. 8. In FIGS. 9A and 9B, there are shown a pair of guide supports 18, specifically, left and right guide supports, and each of the guide supports has, in two locations, slide bearings 15c permitting insertion of the tie bars 5 and, in at least one location, a hole permitting insertion of the movable platen guide 13.

The mold clamping mechanism having each guide support 18 for supporting one end of each movable platen guide 13, separate from the rear platen, enables vertical adjustment of one end of each movable platen guide 13 to be attained without causing the action of the support 16c on the rear platen.

Figure 10:
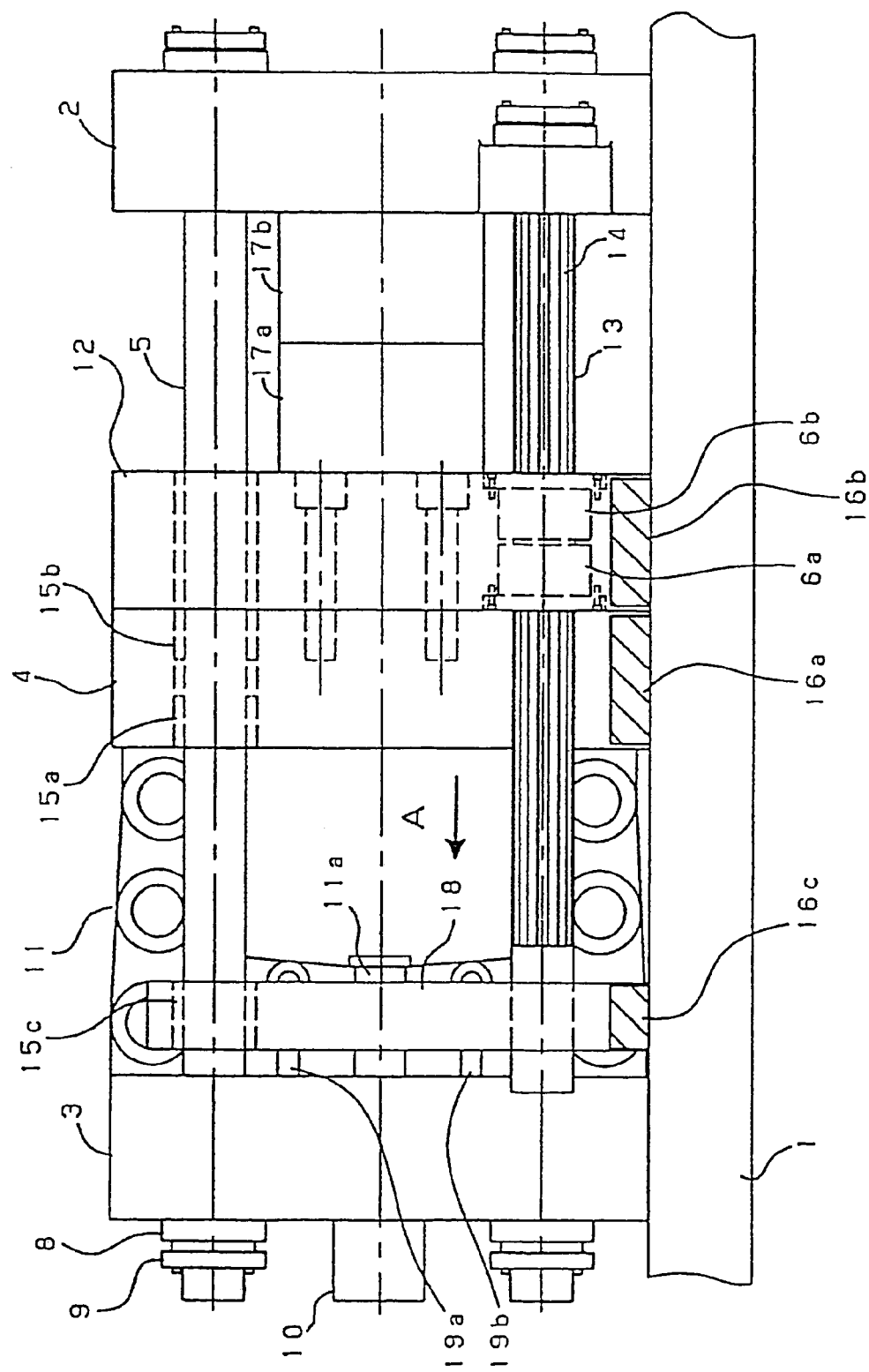
FIG. 10 is a schematic view showing a mold clamping mechanism according to a fourth embodiment of the present invention.
Figure 11:
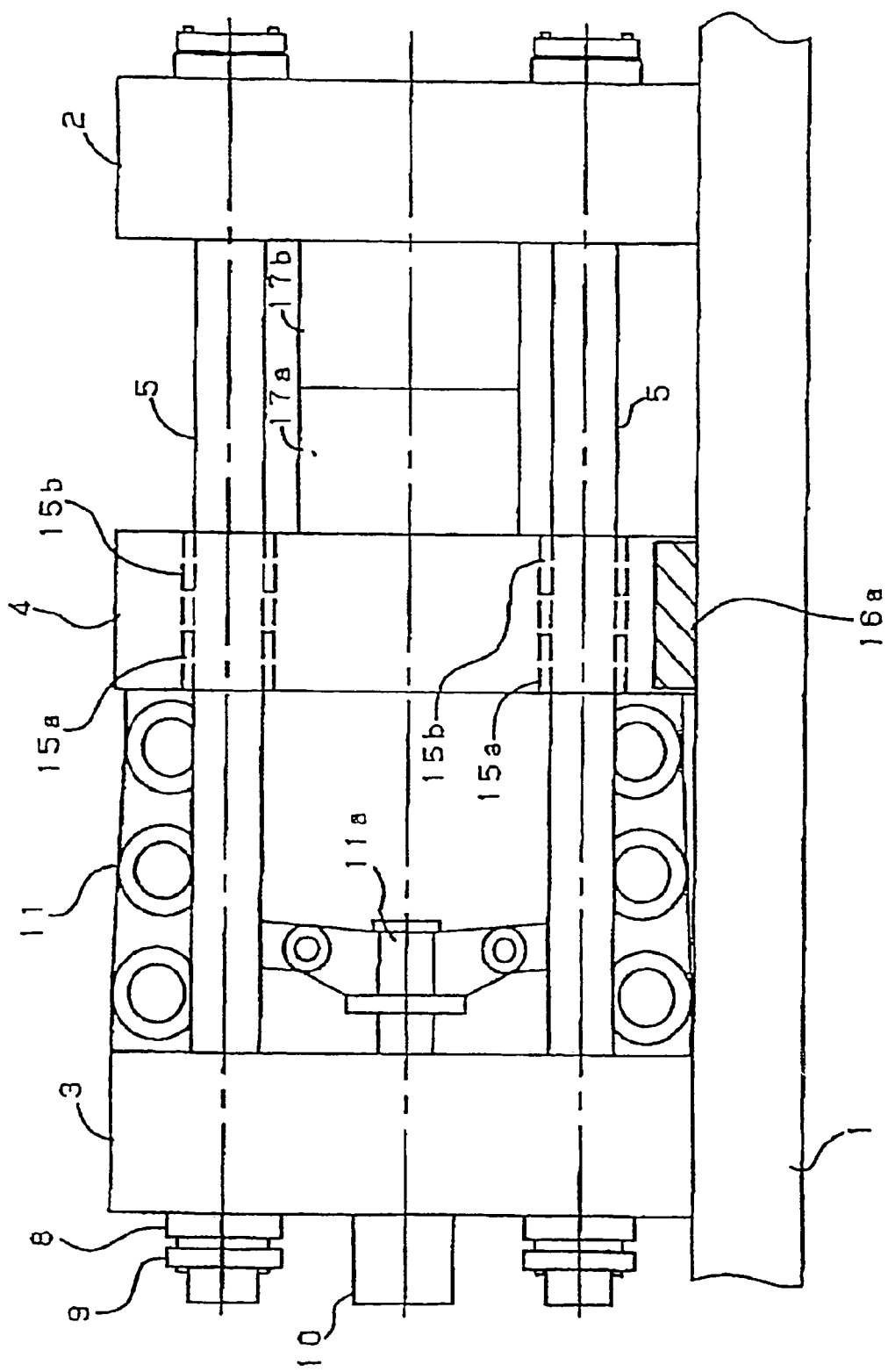
FIG. 11 is a schematic view for use in an illustration of a conventional mold clamping mechanism of a molding machine such as an injection molding machine.
Figure 12:
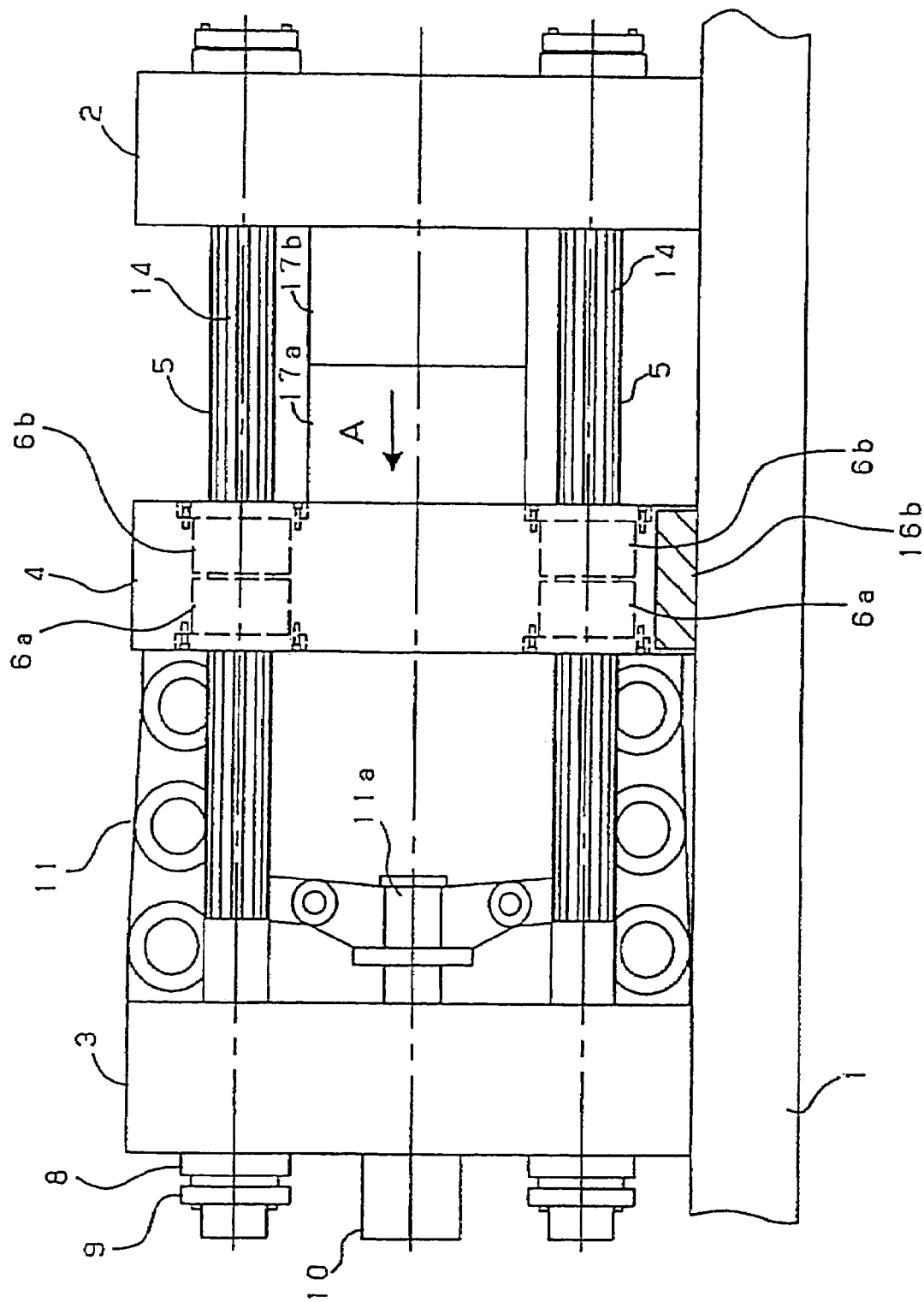
FIG. 12 is a schematic view for use in an illustration of the other conventional mold clamping mechanism of the molding machine such as the injection molding machine.
Figure 13:
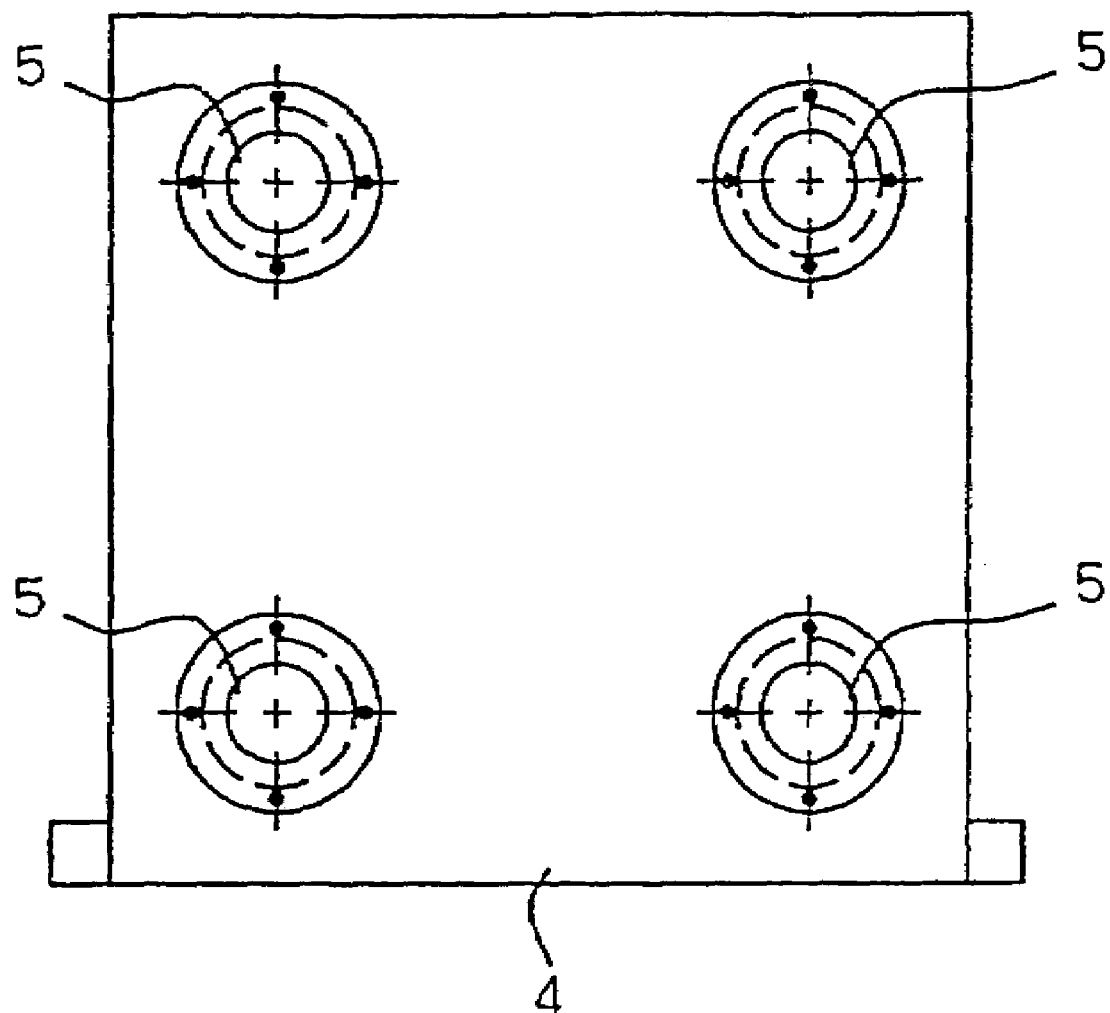
FIG. 13 is a view taken along the direction shown by an arrow A in FIG. 12.

The mold clamping mechanism according to a fourth embodiment of the present invention will be described with reference to FIG. 10. FIG. 10 is a schematic view showing the mold clamping mechanism according to the fourth embodiment. The mold clamping mechanism shown in FIG. 10 has the guide support 18 between the movable platen 4 and the rear platen 3, and the guide support 18 is adapted to support the movable platen guides 13.

The mold clamping mechanism according to the fourth embodiment shown in FIG. 10 is equivalent to a structure obtained by adding the guide support to the mold clamping mechanism (See FIG. 5) according to the second embodiment. It is thus noted that in the following description on the fourth embodiment, a different arrangement from the second embodiment is only described without giving any description of the arrangement common to the first and second embodiments.

The guide support 18 is placed between the movable platen 4 and the rear platen 3, and is supported in two locations with the tie bars 5 through the slide bearing bush 15c. Also, the guide support 18 is connected to the rear platen 3 through the connection members 19a, 19b. Each of the connection members 19a, 19b may be an integral part of the rear platen 3. Alternatively, each of the connection members 19a, 19b and the rear platen 3 may be different parts. Further, the guide support 18 has a hole permitting insertion of one end of each movable platen guide 13 to ensure that insertion of each movable platen guide 13 into the hole of the guide support is adapted to support one end of each movable platen guide 13. The guide support 18 may also have the height adjusting support 16c.

The mold clamping mechanism (shown in FIGS. 1, 5, 8 and 10) according to each of the first to fourth embodiments provides guiding of the movable platen guides 13 in such a manner as to allow one end of each movable platen guide 13 to be inserted into the hole of the rear platen 3 or the guide support 18, with the other end thereof fixed to the fixed platen 2. Alternatively, guiding of the movable platen guides 13 may be also provided in such a manner as to allow one end of each movable platen guide 13 to be inserted into the hole of the fixed platen 2, with the other end thereof fixed to the rear platen 3 or the guide support 18.

The guide support 18 in the above third and fourth embodiments is supported in two locations with the tie bars 5 through the slide bearing bush 15c, and is also connected to the rear platen 3 through the connection members 19a, 19b. Alternatively, supporting and connection of the guide support 18 are not limited to the above method, and the guide support 18 may be also mounted in a vertical position on the base frame 1.

As described the above, in the arrangement in which prevention of tilting of the movable platen is provided by using the ball spline shaft, the present invention makes it possible to obtain the ball spline shaft whose diameter is small-sized, and also to provide facilitation of manufacturing, with a cost reduction attained.

What is claimed is:

1. A mold clamping mechanism of a molding machine, which has a fixed platen mounted on a base frame of the molding machine, a rear platen, tie bars permitting said fixed platen to be connected to said rear platen, and a movable platen placed between said rear platen and said fixed platen, and is adapted to effect clamping of molds mounted to said movable platen and said fixed platen by moving the movable platen along said tie bars, wherein, said mold clamping mechanism has at least two pieces of movable platen guides, separate from said tie bars;

said movable platen has movable platen guide insertion holes into which said movable platen guides are inserted;

each of said movable platen guides having a sliding part in the form of a ball spline shaft;

ball spline nuts are provided in said movable platen guide insertion holes of said movable platen; and wherein the mold clamping mechanism further has a guide support between said rear platen and said movable platen, said guide support being adapted to support said movable platen guides in an inserted condition.

2. A mold clamping mechanism of a molding machine, comprising:

a fixed platen mounted on a base frame of the molding machine;

a rear platen connected to the fixed platen;

a plurality of tie bars each having an end fixed to the fixed platen and the rear platen;

a movable platen having a plurality of tie bar insertion holes defined therein, each of the tie bars passing through a respective tie bar insertion hole, the movable platen having a plurality of movable platen guide insertion holes defined therein;

at least two movable platen guides being separate from the tie bars, each of the movable platen guides passing through a respective movable platen guide insertion hole, a movable platen sliding portion of each of the movable platen guides having a ball spline shaft, one end of each movable platen guide being fixed to the fixed platen and an opposing end of each movable platen guide being non-fixedly supported at a rear platen side;

a plurality of ball spline nuts provided in each of the movable platen guide insertion holes and adapted to engage the ball spline shaft portion of the movable platen guides; and a guide support connected to the rear platen or to the base frame at the rear platen side and having a plurality of tie bar apertures defined therein and a plurality of guide holes defined therein, the tie bars passing through the tie bar apertures, the guide holes being adapted to receive the opposing end of each movable platen guide, such that the guide support supports the opposing end of each movable platen guide.

3. The mold clamping mechanism according to claim 2, further comprising a height adjusting support attached to the guide support, the height adjusting support being adjustable for greater or lesser height of the guide support.

4. The mold clamping mechanism of the molding machine according to claim 1, wherein said movable platen is composed of a movable member and an auxiliary member fixed to a fixed platen side surface of the movable member.

* * * * *